(12) United States Patent
Biederman

(10) Patent No.: US 7,319,667 B1
(45) Date of Patent: Jan. 15, 2008

(54) COMMUNICATION SYSTEM WITH PRIORITY DATA COMPRESSION

(75) Inventor: Daniel Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 09/713,849

(22) Filed: Nov. 15, 2000

(51) Int. Cl.
*H04L 12/26* (2006.01)

(52) U.S. Cl. .................. 370/231; 370/230.1; 370/465; 370/466; 370/477

(58) Field of Classification Search ............ 370/230.1, 370/237, 349, 351, 352, 401, 465, 466, 471, 370/476, 477, 230; 709/201, 203, 212, 213, 709/216–219, 246, 247
See application file for complete search history.

(56) References Cited

U.S. PATENT DOCUMENTS

| | | | |
|---|---|---|---|
| 3,889,057 A | 6/1975 | Perreault et al. ............ 178/69.5 |
| 3,914,538 A | 10/1975 | Perreault et al. ................ 178/6 |
| 4,058,838 A | 11/1977 | Crager et al. ................ 358/257 |
| 4,748,638 A | 5/1988 | Friedman et al. ................ 375/8 |
| 4,862,167 A | 8/1989 | Copeland, III ............... 341/107 |
| 4,937,844 A | 6/1990 | Kao ............................ 375/122 |
| 5,384,780 A | 1/1995 | Lomp et al. ................ 370/94.1 |
| 5,463,616 A | 10/1995 | Kruse et al. .................... 370/24 |
| 5,515,377 A | 5/1996 | Horne et al. ................ 370/94.1 |
| 5,541,919 A * | 7/1996 | Yong et al. .................. 370/416 |
| 5,546,395 A * | 8/1996 | Sharma et al. .............. 370/468 |
| 5,682,386 A | 10/1997 | Arimilli et al. ............. 370/468 |
| 5,757,801 A | 5/1998 | Arimilli ....................... 370/444 |
| 5,828,695 A | 10/1998 | Webb .......................... 375/219 |
| 5,838,927 A * | 11/1998 | Gillon et al. ................ 709/247 |
| 5,926,237 A | 7/1999 | Yun et al. ...................... 349/58 |
| 6,005,890 A | 12/1999 | Cow et al. ................... 375/221 |
| 6,011,590 A | 1/2000 | Saukkonen ................. 348/419 |
| 6,014,694 A * | 1/2000 | Aharoni et al. ............. 709/219 |
| 6,275,502 B1 * | 8/2001 | Arimilli ...................... 370/468 |
| 6,377,573 B1 * | 4/2002 | Shaffer et al. .............. 370/356 |
| 6,449,658 B1 * | 9/2002 | Lafe et al. .................. 709/247 |
| 6,542,504 B1 * | 4/2003 | Mahler et al. .............. 370/392 |
| 6,574,207 B2 * | 6/2003 | Kurtz .......................... 370/337 |
| 6,611,531 B1 * | 8/2003 | Chen et al. .................. 370/458 |
| 6,728,778 B1 * | 4/2004 | Brennan et al. ............ 709/238 |
| 6,826,153 B1 * | 11/2004 | Kroon ......................... 370/235 |
| 6,865,187 B1 * | 3/2005 | Ghosh et al. ............... 370/431 |
| 6,888,815 B2 * | 5/2005 | Kurtz .......................... 370/344 |
| 6,977,898 B1 * | 12/2005 | Miriyala ..................... 370/236 |

(Continued)

OTHER PUBLICATIONS

Blake, et al., "An Architecture for Differentiated Services", IETF RFC 2475, Dec. 1998.

*Primary Examiner*—Wing Chan
*Assistant Examiner*—Mark A. Mais
(74) *Attorney, Agent, or Firm*—Cindy Kaplan

(57) ABSTRACT

A data compression system that dynamically adapts the degree of compression used in response to the priority of the data to be compressed is provided by virtue of one embodiment of the present invention. In one embodiment, only low priority data is compressed while high priority data is passed through to the network in uncompressed form. Also, the compression ratio can be varied depending on the priority of the data to allocate a larger portion of available bandwidth to higher priority traffic while imposing greater compression related delay on lower priority traffic.

29 Claims, 4 Drawing Sheets

U.S. PATENT DOCUMENTS 7,061,885 B2 * 6/2006 Kurtz ......................... 370/329
7,068,594 B1 * 6/2006 Tasker ........................ 370/217
7,069,342 B1 * 6/2006 Biederman ................. 709/247
7,133,417 B1 * 11/2006 Kao et al. .................... 370/467
7,161,931 B1 * 1/2007 Li et al. ...................... 370/352

* cited by examiner

COMMUNICATION SYSTEM WITH PRIORITY DATA COMPRESSION

BACKGROUND OF THE INVENTION

The present invention relates to data communication systems and more particularly to systems and methods for managing limited network capacity as well as systems and methods for handling data traffic having different priority levels.

The demand for data communication services is growing at an explosive rate. More and more residential and business users are being connected to the Internet. Furthermore, the types of traffic being carried by the Internet are shifting towards high bandwidth applications such as voice and video traffic.

To accommodate the growth and demand for Internet services, service providers are rapidly installing network switching devices such as routers and upgrading physical media throughout their networks. For user access, dial-in lines are being replaced by DSL, cable modem, and broadband fixed wireless. Increasingly, the network backbone exploits optical fiber physical media. Fiber is also being deployed further toward the network edge so that, for example, data over cable networks are being transformed into HFC (highbred fiber cable) networks. Yet even with these advances in data networking technologies and the high level of investment by service providers, demand for network bandwidth continues to outpace supply.

One technique that may be applied to expand the effective throughput of a network is data compression. Data compression techniques take advantage of redundancy inherent in many types of data. For example, text documents may be compressed by assigning a variable number of bits to individual letters depending on their frequency in the document. If letters that appear frequently are encoded by a very small number of bits, this can greatly reduce the amount of data required to store and/or communicate the document. More sophisticated techniques can be used to encode voice and/or video traffic.

However, the processing necessary to perform compression at the data source and decompression at the data sink (destination) may add an intolerable level of delay. This delay may be insignificant for certain types of data traffic such as email, tolerable but undesirable for web downloading, and intolerable for real time voice or video communication.

What is needed are systems and methods for data communication that take advantage of the capacity increasing capabilities of data compression technology while protecting delay sensitive traffic or other high priority traffic from the adverse consequences of compression processing calculations.

SUMMARY OF THE INVENTION

A data compression system that dynamically adapts the degree of compression used in response to the priority of the data to be compressed is provided by virtue of one embodiment of the present invention. In one embodiment, only low priority data is compressed while high priority data is passed through to the network in uncompressed form. Also, the compression ratio can be varied depending on the priority of the data to allocate a larger portion of available bandwidth to higher priority traffic while imposing greater compression related delay on lower priority traffic.

A first aspect of the present invention provides a method for forwarding packets across a packet switched network. The method includes assigning a priority level to a packet, selecting the packet for data compression responsive to the priority level, and sending the packet through the network.

A further understanding of the nature and advantages of the inventions herein may be realized by reference to the remaining portions of the specification and the attached drawings.

DESCRIPTION OF SPECIFIC EMBODIMENTS

Generally, the packet processing techniques of the present invention may be implemented in software and/or hardware. For example, they can be implemented in an operating system kernel, in separate user processes, in a library package bound into a network application, on a specially constructed machine, or on a network interface card. In specific embodiment of this invention, these techniques may be implemented in software such as an operating system or in an application running on an operating system.

A software or software/hardware hybrid packet processing system of this invention is preferably implemented on a general-purpose programmable machine selectively activated or reconfigured by a computer program stored in memory. Such a programmable machine may be a network device designed to handle network traffic. Such network devices typically have multiple network interfaces such as frame relay and ISDN interfaces, for example. Specific examples of such network devices include routers and switches. For example, the packet processing systems of this invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
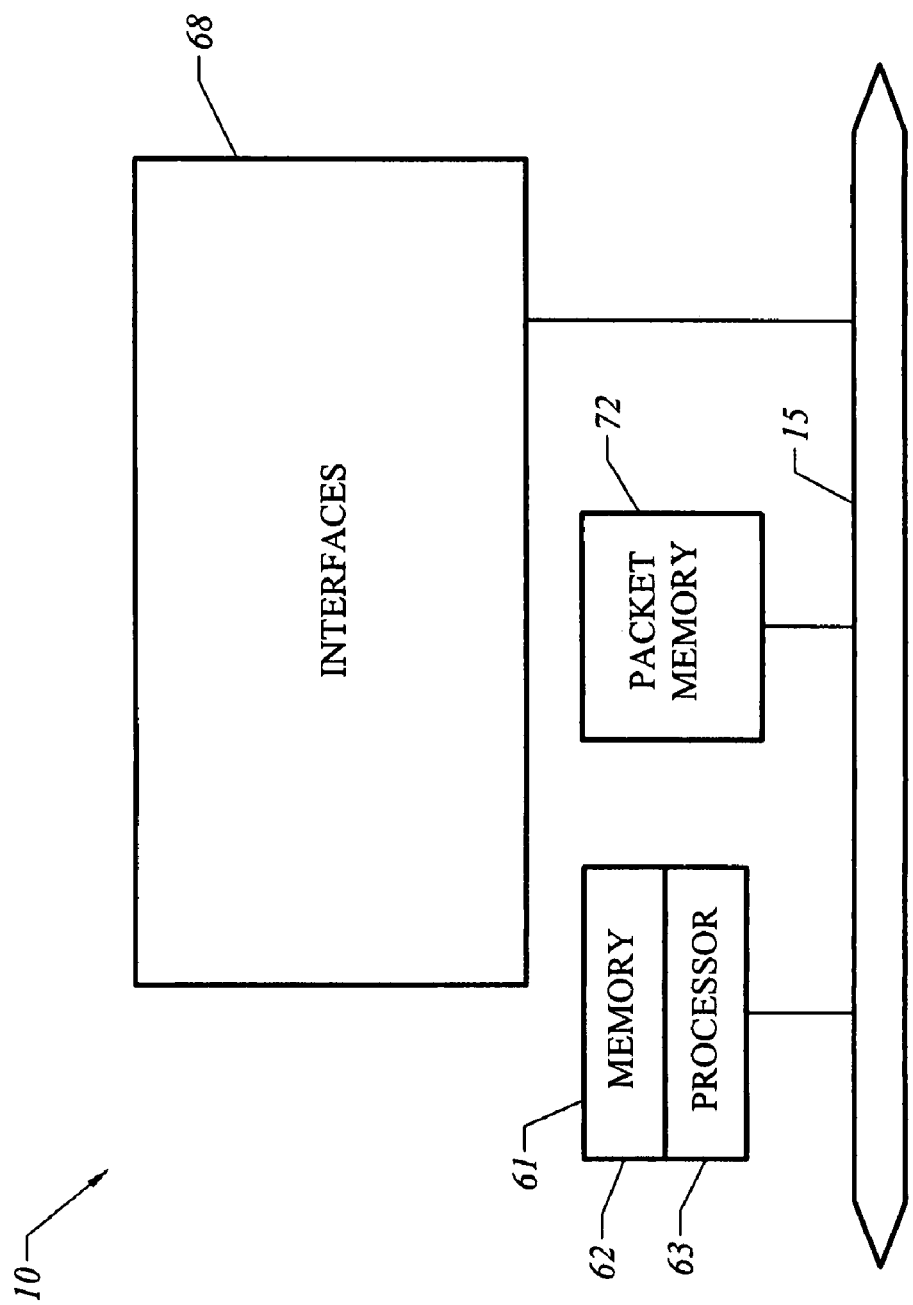
FIG. 1 depicts a router that may be used in implementing one embodiment of the present invention.

Referring now to FIG. 1, a router 10 suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system (e.g., a version of the Internetwork Operating Systems (IOS®) of Cisco Systems, Inc.) and any appropriate applications software. CPU 61 may include one or more processors 63 such as a processor from the Motorola family or MIPS family of microprocessors. In an alternative embodiment, processor 63 is specially designed hardware for controlling the operations of router 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces, FTTH interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 10 may further include a packet memory 72 for intermediate storage of packets being forwarded by router 10.

Although the system shown in FIG. 1 is one specific router usable to implement the present invention, it is by no means the only architecture on which the present invention can be implemented. For example, an architecture having a single processor that handles communications as well as routing computations, etc. is often used. Other types of interfaces and media could also be used with the router.

Regardless of a network device's configuration, it may employ one or more memories or memory modules (including memory 62) configured to store program instructions for the general-purpose network operations and packet processing functions described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 2:
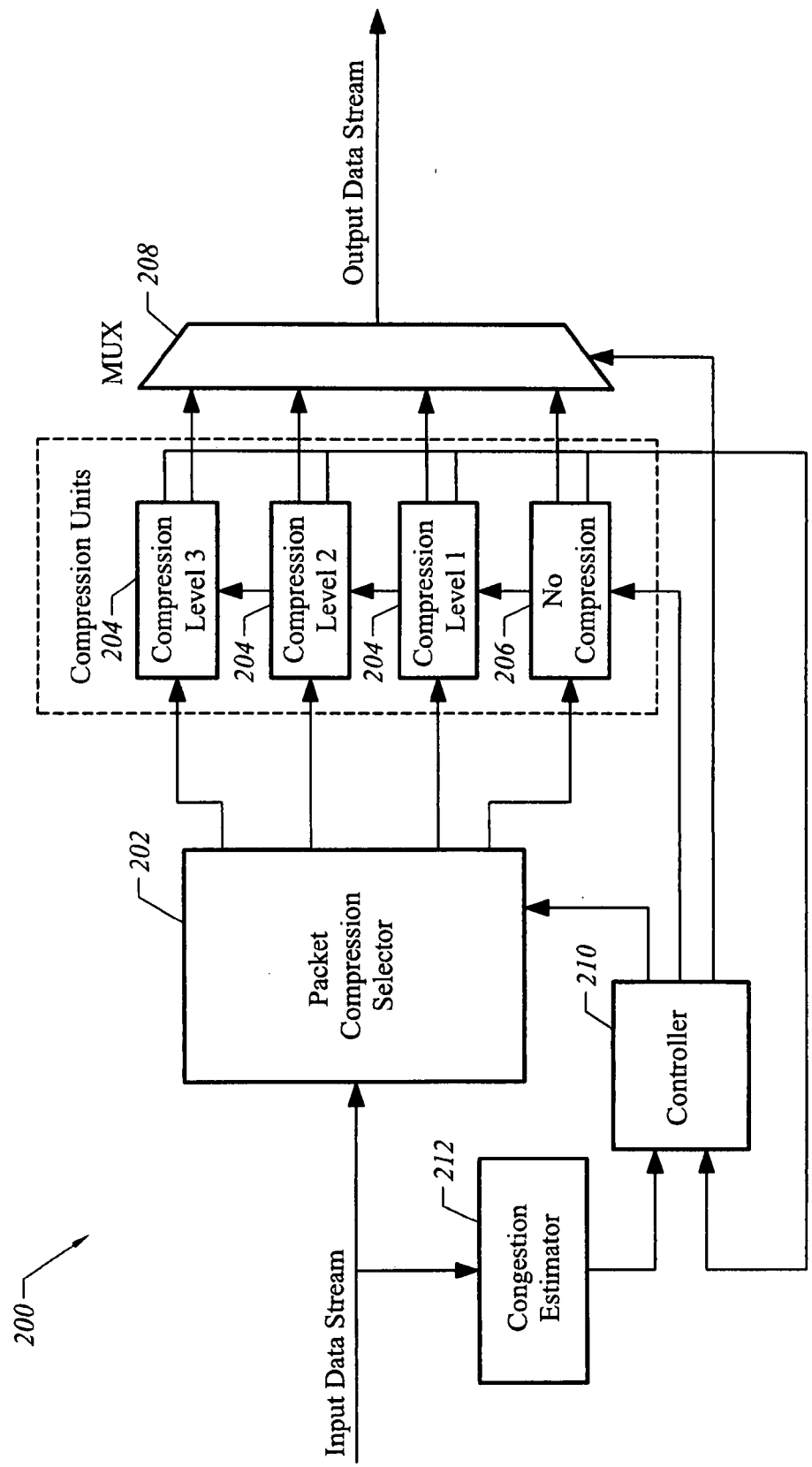
FIG. 2 depicts a data compression system based on data transmission priority according to one embodiment of the present invention.

FIG. 2 depicts a data compression system 200 according to one embodiment of the present invention. Data compression system 200 may operate in many different data networking contexts. For example, router 10 may, e.g., represent the interface between a customer network and a larger scale service provider network. Data compression system 200 may operate on packets forwarded from the customer network to the service provider network, applying varying degrees of data compression to help manage the bandwidth that the service provider makes available to the customer. Data compression system 200 then may be implemented in hardware and/or software of one on interfaces 68 or in software stored in memory 62.

Packets to be forwarded into the service provider network are input to a packet compression selector 202. Packet compression selector 202 determines the priority level of each packet. In one embodiment, the priority level is related to the traffic. For example, a video or voice packet supporting a real time communication link may have a high priority, a packet used in web browsing may have a medium priority and a packet communicating email information may have a low priority.

Alternatively, the priority level of a packet may be related to a differentiated service model such as is described in Blake, *An Architecture for Differentiated Services*, IETF RFC 2475 (December 1998) the entire contents of which are herein incorporated by reference. In a differentiated services system, each packet belongs to one of a number of forwarding classes. Priority in routing is determined based on the forwarding class. These forwarding classes or any other quality of service class can also be used to determine priority level for the purposes of compression here.

Packet compression selector 202 determines the priority class based on information in the packet header or contents. Based on the priority level and, in one embodiment, the degree of network congestion currently being experienced, packet compression selector 202 forwards each packet to a selected one of compression units 204 or designates the packet to be forwarded with its contents uncompressed. In general, data having higher priority is subject to a lower level of compression to save the time required to perform the compression operations. The degree of network congestion may determine the average level of compression is used or even whether compression is used at all. The effect of compressing a class of traffic is to decrease the volume of data belonging to that class that is transmitted and therefore reduce the share of network bandwidth allocated to the class.

There are three compression units 204 in the representative embodiment depicted in FIG. 2: "level 1", "level 2", and "level 3". The level 1 compression unit uses the lowest compression level and the least processing delay. The level 2 compression unit has a higher compression level and longer processing delay than the level 1 compression unit. The level 3" compression unit has the highest compression level and the longest processing delay. The term "compression level" as used herein refers to the extent to which the compression unit seeks to compacts its input data. A high compression level corresponds to a high target ratio of quantity of input data over quantity of compressed output data. A block 206 is depicted to signify no compression.

Each of compression units 204 may operate according to a different compression technique to achieve different compression ratios. Alternatively, two or more of compression units 204 may utilize similar compression techniques but with different parameters to achieve different compression ratios. For example, the three depicted compression units 204 can each implement the well-known Huffman code compression technique. The level three compression unit would use a longer processing time to arrive at a more compact encoded representation than would be obtained by the level two compression unit which in turn would use a greater processing time to arrive at a more compact representation than the level one compression unit.

A multiplexer 208 selects the output of one of compression units 204 or no compression block 206 for output based on the availability of such data. Where multiple compression units and/or no compression block 206 have data available, the data having the lower level of compression will be preferred to emphasize its higher priority.

The mapping between priority levels and compression units 204 (or no compression) is determined by a controller 210. Operation details of controller 210 will be described with reference to FIG. 3 and FIG. 4. In part, the mapping between priority levels and compression levels may depend on the degree of network congestion. A congestion estimator 212 determines the amount of network congestion in the network to be traversed by the packets processed by data compression system 200.

In one embodiment, congestion estimator 212 determines congestion by measuring the data flow into data compression system 200 and comparing this measurement to the data flow rate authorized by an operative service level agreement (SLA) between the customer and service provider. Alternatively, congestion estimator 212 receives congestion indication information from the service provider network.

Controller 210 preferably operates so as to compress the input data stream to accommodate current congestion conditions while minimizing the delay caused by compression. To the extent that compression is used to shape the data flow to accommodate available bandwidth and congestion, the delay is imposed on lower priority traffic. As congestion increases lower priority data is increasingly compressed so that room will be available for higher priority data.

This operation will be made clearer with reference to a specific example illustrating the behavior of data compression system 200 as congestion in the service provider network increases. In this example, the data input to packet compression selector 200 includes packets of four priority levels: highest, high, medium and low. The level three compression unit has a target compression ratio of four to one and can compress 40 megabytes in one second. The level two compression unit has a target compression ratio of three to one but only requires ten milliseconds to compress forty megabytes. The level one compression unit has a target compression ratio of 1.5 to 1 and compresses forty megabytes in one millisecond.

Assume that congestion estimator 212 detects a relatively low level of network congestion. Packets having low priority are directed through the level one compression unit while packets having the three other priority levels are not compressed. Assume that network traffic increases so that more congestion is detected by congestion estimator 212. Then, the low priority data will be directed to the level two compression unit while the medium priority data is sent to the level one compression unit. The data having the highest priority level and the high priority level will be continue to be sent uncompressed. Upon a further increase in network congestion, high priority data will be sent to the level one compression unit, medium priority data will be sent to the level two compression unit, low priority data will be sent through the level three compression unit while the highest priority data will be sent uncompressed. Then as network congestion decreases, data compression system 200 reduces the compression ratio used for the lower priority classes to increase the speed of processing and reduce the delay imposed on the lower priority traffic.

Figure 3:
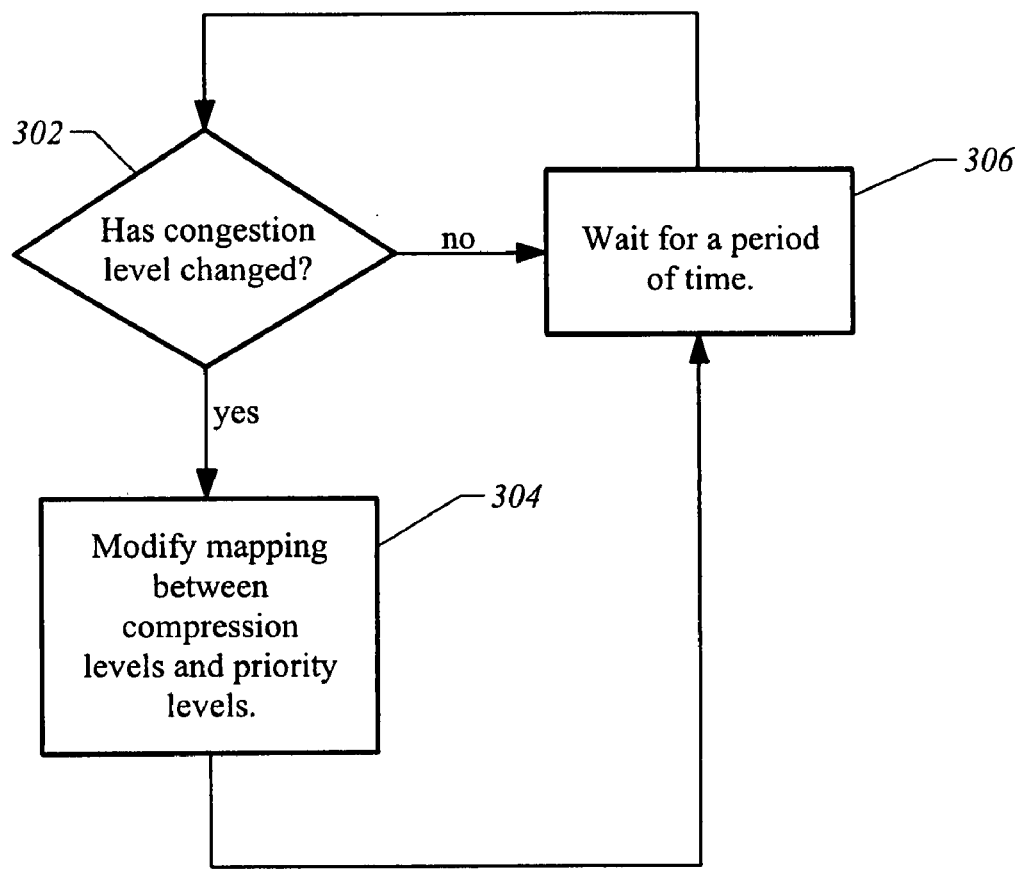
FIG. 3 is a top-level flowchart describing steps of compressing data to be transmitted across a network according to one embodiment of the present invention.

FIG. 3 is a flowchart depicting the operation of controller 210 at a high level. At step 302, controller 210 determines if the degree of congestion has changed since the last measurement. If the degree of congestion has not changed, the mapping between priority levels and compression levels is left intact and controller 210 waits for the next congestion measurement time at step 304. Once this time has elapsed, the congestion is measured again at step 302. If the degree of congestion has changed, the mapping between priority levels and compression levels is modified by controller 210 at step 306.

Figure 4:
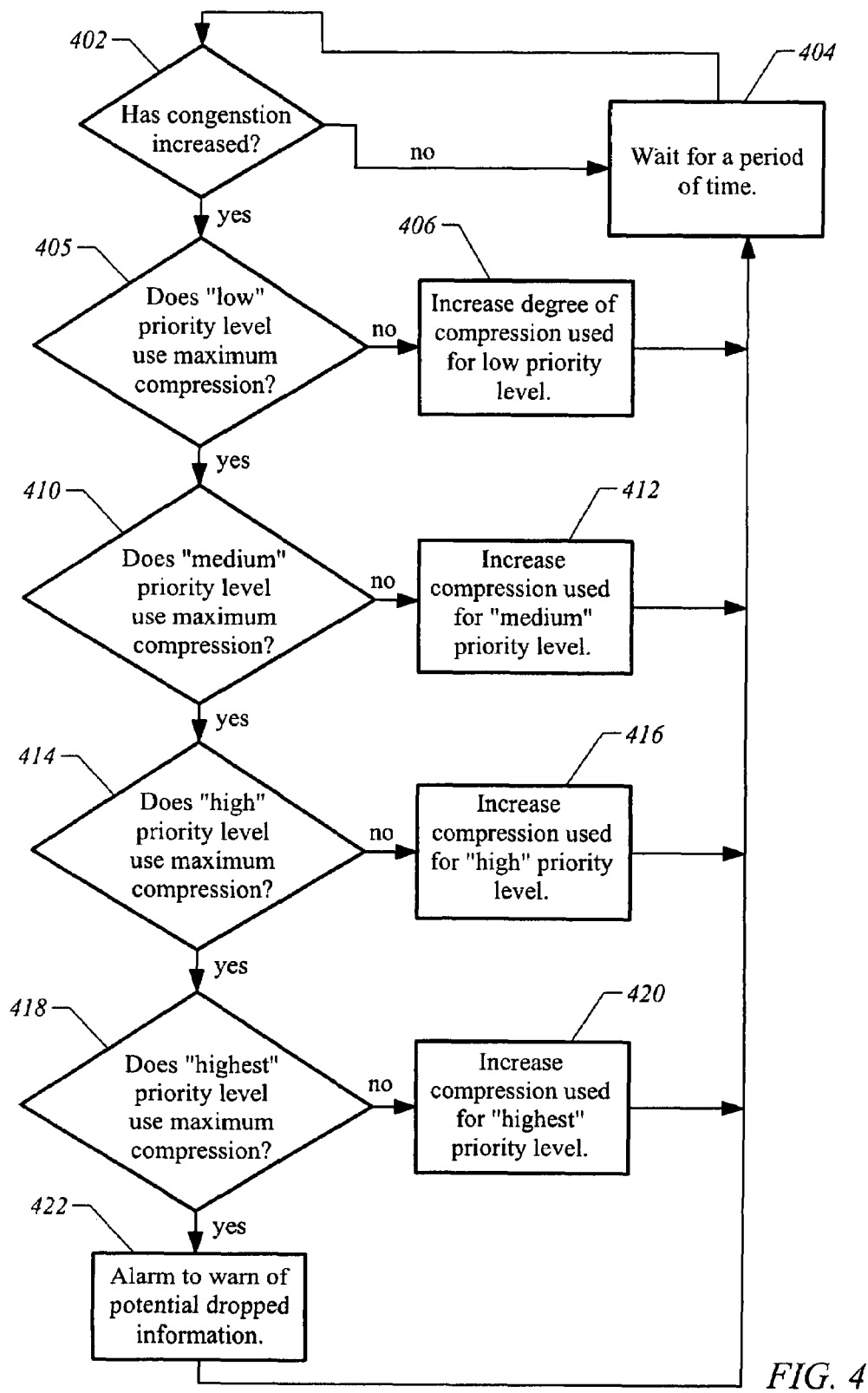
FIG. 4 is a detailed flowchart describing steps of compressing data to be transmitted across a network according to one embodiment of the present invention.

FIG. 4 is a more detailed flowchart showing the operation of controller 210. The flowchart of FIG. 4 assumes four priority levels and shows the operation of controller 210 as congestion increases. It will be appreciated that the procedure of FIG. 4 is easily modified to handle decreasing congestion.

At step 402, controller 210 determines if congestion has increased since the last measurement time. If congestion has not increased, then the processing proceeds to a step 404 to wait until the next measurement time after which step 402 is revisited. If step 402 determines that congestion has in fact increased, then a step 405 determines if the low priority level traffic is currently using the maximum compression available. If the low priority level is not using the maximum compression available then the degree of compression for this low priority level is increased at step 406. If the low priority already uses the maximum amount of compression available, then the processing proceeds to a step 410.

Step 410 determines whether the medium priority level uses the maximum amount of compression available. If the medium level does not use the maximum amount of compression available, controller 210 increases the compression used for the medium priority level at step 412.

If the medium priority level already uses the maximum compression available, controller 210 proceeds to step 414. Step 414 tests whether the high priority level uses the maximum compression available. If the high priority level does not use the maximum compression available then the compression used for the high priority level is increased at step 416. If the high priority level already uses the maximum compression then controller 210 performs step 418.

Step 418 determines if the highest priority level information already is compressed to the maximum extent possible. If step 418 determines that the highest priority information is not already subject to the maximum compression available, then the compression used for the highest priority level is increased at step 420. If the highest priority level already uses the maximum compression available, data compression system 200 is no longer able to compress information further to cope with current network congestion and a step 422 alerts the user or a higher level application of the potential for dropped information due to congestion.

Step 404 where controller 210 awaits the next measurement event occurs after any of steps 406, 412, 416, 420 or 422. In FIG. 4, as congestion increases, traffic of a given priority class has its compression ratio (and therefore imposed delay) increased to the maximum level before the compression regime is changed for any higher priority class. Alternatively, controller 210 may increase the compression ratio for each priority class by one step before further increasing the compression ratio of any priority class.

It is understood that the examples and embodiments are described herein for illustrative purposes only and that various modifications and changes in light thereof will be suggested to persons skilled in the art and are to be included within the spirit and purview of this application and scope of the appended claims and their full scope of equivalents. For example, any number of priority levels or compression levels may be used. Also, is not necessary that the mapping between compression levels and priority levels be sensitive to a measured level of network congestion. Furthermore, although the invention has been described with reference to a packet network, it may also be implemented in the context of a circuit-switched network or any other kind of communication network. All publications, patents, and patent applications cited herein are hereby incorporated by reference in their entirety.

The invention claimed is:

1. In a communication network, a method for forwarding data across said network, said method comprising:
   associating each of two or more priority levels with different compression levels, wherein said priority levels are assigned to data supporting both real time and non-realtime communications;
   receiving data comprising packets, wherein at least some of the packets support real time and at least some of the packets support non-real time communications;
   assigning one of said priority levels to said data, wherein said priority level is based on a delay tolerance of said data and data supporting real time communication has a higher priority level than data not supporting real time communication;
   selecting a compression level for said data based on said priority level; and
   sending said data through said network.

2. The method of claim 1 further comprising:
   compressing said data only if said priority level is below a threshold.

3. The method of claim 1 further comprising:
   compressing said data according to said priority level prior to sending said data through said network.

4. The method of claim 1 wherein determining said compression level comprises determining said compression level according to an inverse relationship between said compression level and said priority level so that high priority traffic is favored in allocating bandwidth.

5. The method of claim 1 further comprising:
   determining a compression level for said data based on said priority level and network congestion; and
   compressing said data according to said priority level prior to sending said data through said network.

6. The method of claim 5 wherein determining mid compression level comprises determining said compression level according to an inverse relationship between said compression level and said priority level so that high priority traffic is favored in allocating bandwidth.

7. The method of claim 1 further comprising;
   setting a threshold priority level for compression eligibility based on network congestion; and
   compressing said data only if said priority level is below said threshold.

8. The method of claim 1 wherein said priority level corresponds to a quality of service class.

9. The method of claim 1 wherein said data comprises a packet.

10. In a digital communication network, a method for forwarding packets across said network, said method comprising:
    associating each of two or more priority levels with different compression levels, wherein said priority levels are assigned to data supporting both real time and non-realtime communications;
    providing a data compression system having a variable compression level;
    inputting said packets to said data compression system while adjusting said variable compression level for individual ones of said packets responsive to said priority level of said packets, wherein said priority level is based on a delay tolerance of said packets and packets supporting real time communication have a higher priority level than packets not supporting real time communication; and
    sending said packets as compressed through said network.

11. In a digital communication network, apparatus for forwarding data across said network, said apparatus comprising:
    a compression switch that receives said data and assigns a compression level to said data responsive to a priority level of said data, wherein said priority level is based on a delay tolerance of said data and is assigned to data supporting both real time and non-real time communications;
    a compression system that compresses said data according to said compression level; and
    an output interface that forwards said data across said network as compressed by said compression system;
    wherein each of two or more priority levels are associated with different compression levels.

12. The apparatus of claim 11 wherein said compression system assigns said compression level according to an inverse relationship between said compression level and said priority level so that high priority traffic is favored in allocating bandwidth.

13. The apparatus of claim 11 further comprising: a network congestion estimator that estimates network congestion; and wherein said compression switch assigns said compression level responsive to said network congestion.

14. The apparatus of claim 11 wherein said data comprises a packet.

15. The apparatus of claim 11 wherein said priority level corresponds to a quality of service class.

16. A computer-readable medium encoded with a computer program for forwarding data across a network, said program comprising:
    code that associates each of two or mote priority levels with different compression levels, wherein said priority levels are assigned to data supporting both real time and non-realtime communications;
    code that assigns said priority level to said data, wherein said priority level is based on a delay tolerance of said data and data supporting real time communication has a higher priority level than data not supporting real time communication;
    code that selects a compression level for said data based on said priority level; and
    code that sends said data through said network.

17. The program of claim 16 further comprising:
    code that compresses the data only if said priority level is below a threshold.

18. The program of claim 16 further comprising:
    code that determines a compression level for said data based on said priority level; and
    code that compresses said data according to said priority level prior to sending said packet through said network.

19. The program of claim 18 wherein said code that determines said compression level comprises code that determines said compression level according to an inverse relationship between said compression level and said priority level so that high priority traffic is favored in allocating bandwidth.

20. The program of claim 16 further comprising:
    code that determines a compression level for said data based on said priority level and network congestion; and code that compresses said data according to said priority level prior to sending said data through said network.

21. The program of claim 20 wherein said code that determines said compression level comprises code that determines said compression level according to an inverse relationship between said compression level and said priority level so that high priority traffic is favored in allocating bandwidth.

22. The program of claim 16 further comprising;
code that selects a threshold priority level for compression eligibility based on network congestion; and
code that compresses said data only if said priority level is below said threshold.

23. The program of claim 16 wherein said data comprises a packet.

24. The program of claim 16 wherein said priority level corresponds to a quality of service class.

25. A computer-readable medium encoded with a computer program for forwarding packets across a network, said program comprising:
code that provides a data compression system having a variable compression level;
code that inputs said packets to said data compression system while adjusting said variable compression level for individual ones of said packets responsive to priority level of said packets, wherein said priority level is based on a delay tolerance of said packets and is assigned to data supporting both real time and non-real time communications; and
code that sends said packets as compressed through said network;
wherein each of two or more priority levels are associated with different compression levels.

26. In a data communication network, apparatus for forwarding data across said network, said apparatus comprising:
means for associating each of two or more priority levels with different compression levels, wherein said priority levels are assigned to data supporting both real time and non-realtime communications;
means for assigning a priority level to said data wherein said priority level is based on a delay tolerance of said data and data supporting real time communication has a higher priority level than data not supporting real time communication;
means for selecting said data for data compression responsive to said priority level; and
means for sending said data through said network.

27. In a packet switched network, apparatus for forwarding packets across said network, said apparatus comprising:
means for compressing data using a variable compression level;
means for inputting said packets to said compressing means while adjusting said variable compression level for individual ones of said packets responsive to priority level of said packets, wherein said priority level is based on a delay tolerance of said packets and is assigned to data supporting both real time and non-real time communications; and
means for sending said packets as compressed through said network;
wherein each of two or more priority levels are associated with different compression levels.

28. The method of claim 1 wherein said data compression comprises at least three different levels of compression corresponding to different priority levels.

29. The method of claim 1 wherein data having a low priority level assigned thereto has a higher compression level and a longer processing delay than data having a high priority assigned thereto.

* * * * *